US006889285B2

(12) United States Patent
Dawson et al.

(10) Patent No.: US 6,889,285 B2
(45) Date of Patent: May 3, 2005

(54) APPARATUS AND METHOD TO MAINTAIN INFORMATION USING A PLURALITY OF STORAGE ATTRIBUTES

(75) Inventors: Erika M. Dawson, Tucson, AZ (US); James A. Fisher, Tucson, AZ (US); Jonathan W. Peake, Tucson, AZ (US); Linda J. Schiltz, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 10/230,907

(22) Filed: Aug. 29, 2002

(65) Prior Publication Data

US 2004/0044829 A1 Mar. 4, 2004

(51) Int. Cl.[7] ............................................. G06F 12/00
(52) U.S. Cl. .................... 711/4; 707/100; 707/200; 711/111; 711/112; 711/170; 711/209
(58) Field of Search ..................... 711/4, 111, 112, 711/170, 209; 707/100, 200, 103 R, 1; 709/245

(56) References Cited

U.S. PATENT DOCUMENTS

| 4,755,928 | A | 7/1988 | Johnson et al. ............. 364/200 |
| 5,659,743 | A | 8/1997 | Adams et al. |
| 6,202,124 | B1 | 3/2001 | Kern et al. ................. 711/112 |
| 6,247,103 | B1 | 6/2001 | Kern et al. ................. 711/162 |
| 6,754,798 | B1 * | 6/2004 | Peloquin et al. ............ 711/210 |
| 2002/0188592 | A1 * | 12/2002 | Leonhardt et al. ............ 707/1 |
| 2003/0177266 | A1 * | 9/2003 | Britton ........................ 709/245 |

FOREIGN PATENT DOCUMENTS

| EP | 1 202 159 A2 | 2/2002 |
| WO | WO 98/40810 | 9/1998 |

OTHER PUBLICATIONS

Baird, "Virtual Storage Architecture Guide (VSAG)", Fourteenth IEEE Symposium on Mas Storage Systems, 1995, pp. 312–326.
IBM, "DFSMS Provides a Total Storage Management Solution", pp. 1–4.
Erner, et al., "A Model of File Server Performance for a Heterogeneous . . . ", 1986, pp. 338–347.
Menon, "A Performance Comparison of RAID–5 and Log-Structured Arrays", 1995, pp. 167–178.
Savage, "Storage Server as Physical Box", 1988, pp. 14–20.

* cited by examiner

Primary Examiner—Mano Padmanabhan
Assistant Examiner—Mehdi Namazi
(74) Attorney, Agent, or Firm—Dale F. Regelman

(57) ABSTRACT

A method to maintain information in a virtual tape system comprising a library inventory using a plurality of storage attributes. The method includes forming a dataset comprising information, and assigning one or more storage construct names to that dataset. The method provides the dataset and the one or more storage construct names to the virtual tape system. The method assigns a plurality of storage attributes to the logical volume using the one or more storage construct names. The method then selects storage management actions for the logical volume based upon those assigned storage attributes.

21 Claims, 7 Drawing Sheets

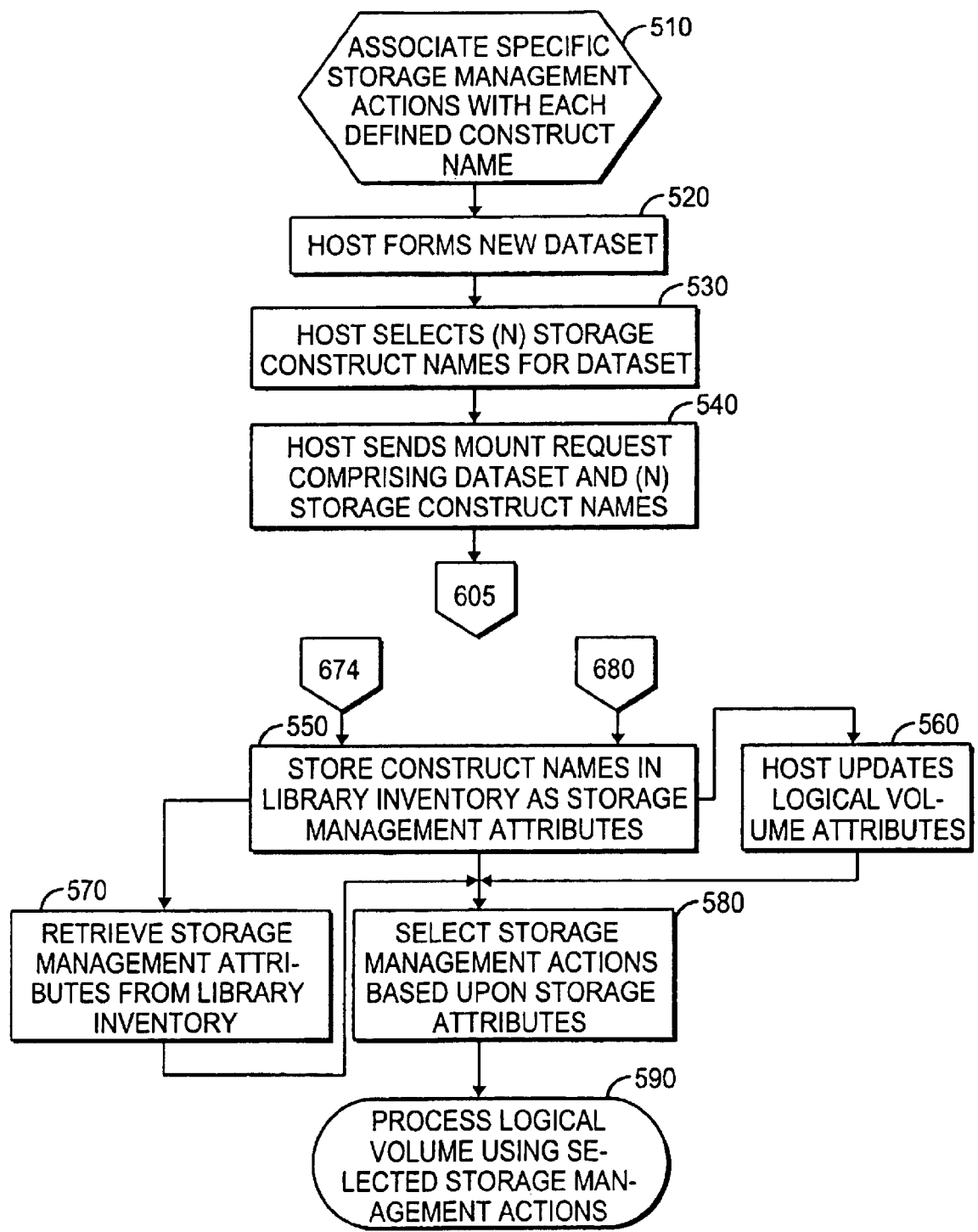

APPARATUS AND METHOD TO MAINTAIN INFORMATION USING A PLURALITY OF STORAGE ATTRIBUTES

FIELD OF THE INVENTION

Applicant's invention relates to an apparatus and method to maintain information using a plurality of assigned storage attributes. In certain embodiments, those one or more assigned storage attributes are stored in a virtual tape system.

BACKGROUND OF THE INVENTION

In hierarchical computer storage systems, intensively used and fast storage are paired with arrays of slower and less frequently accessed data devices. One example of high-speed, expensive memory is a direct access storage device file buffer (DASD). Slower storage devices include tape drives and disk drive arrays, which are less expensive than a DASD.

One such hierarchical storage system is a virtual tape storage system. Such a virtual tape storage system may include, for example, one or more virtual tape servers ("VTS") in combination with one or more data storage and retrieval systems, such as the IBM 3494 Media Storage Library. During operation, the virtual tape storage system is writing data from a host to the numerous data storage devices disposed in the one or more data storage and retrieval systems.

Automated data storage and retrieval systems are known for providing cost effective access to large quantities of stored media. Generally, a data storage and retrieval system includes a large number of storage slots on which are stored portable data storage media. The typical portable data storage media is a tape cartridge, an optical cartridge, a disk cartridge, electronic storage media, and the like. By electronic storage media, Applicants mean a device such as a PROM, EPROM, EEPROM, Flash PROM, and the like.

One (or more) accessors typically accesses the data storage media from the storage slots and delivers the accessed media to a data storage device for reading and/or writing data on the accessed media. Suitable electronics operate the accessor(s) and operate the data storage device(s) to provide information to, and/or to receive information from, an attached on-line host computer system.

SUMMARY OF THE INVENTION

Applicants' invention includes a method and apparatus to maintain information in a virtual tape system comprising a library inventory using a plurality of storage construct names. Applicants' method includes creating a logical volume comprising information, and assigning (N) storage construct names to that logical volume, where (N) is greater than or equal to 0 and less than or equal to 4. Applicants' method provides the logical volume and the (N) storage construct names to the virtual tape system. Applicants' method assigns four storage management attributes to that logical volume using the (N) storage construct names. Applicants' method then selects storage management actions for the logical volume based upon those four storage management attributes.

BRIEF DESCRIPTION OF THE DRAWINGS

The invention will be better understood from a reading of the following detailed description taken in conjunction with the drawings in which like reference designators are used to designate like elements, and in which:

FIG. 5 is a flow chart summarizing certain steps in Applicants' method;

DETAILED DESCRIPTION OF THE PREFERRED EMBODIMENTS

Referring to the illustrations, like numerals correspond to like parts depicted in the figures. The invention will be described as embodied in a virtual tape server in combination with an automated data storage and retrieval subsystem for use in a data processing environment. The following description of Applicant's apparatus and method is not meant, however, to limit Applicant's invention to either data storage and retrieval systems, or to data processing applications, as the invention herein can be applied to data storage in general.

Figure 3:
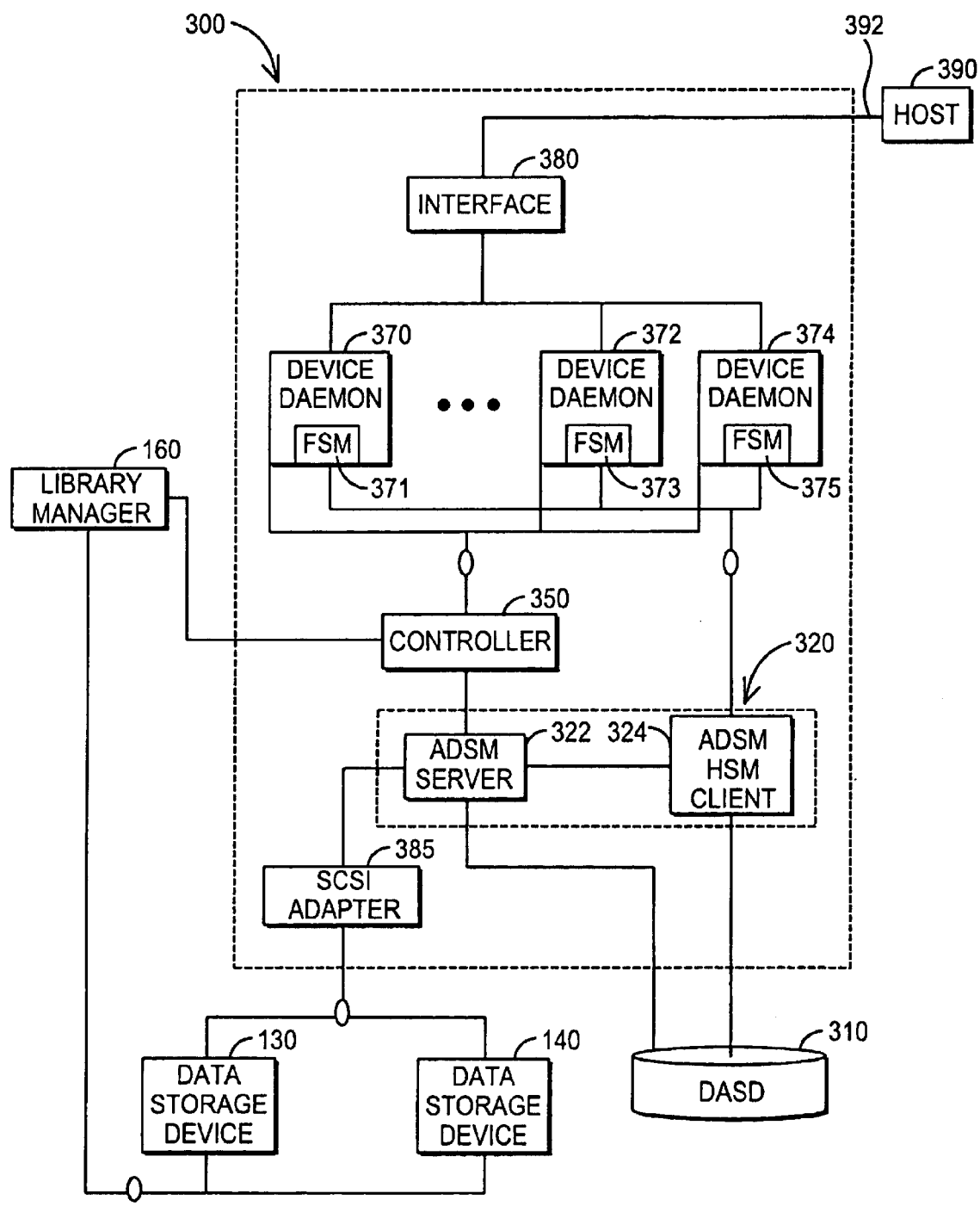
FIG. 3 is a block diagram showing the components of Applicants' virtual tape system.

FIG. 3 illustrates the hardware and software environment in which preferred embodiments of the present invention are implemented. Virtual tape server (VTS) 300 is pictured, operatively coupled to a host computer 390. In certain embodiments, host computer 390 comprises a single computer. In alternative embodiments, host computer 390 comprises one or more mainframe computers, one or more work stations, one or more personal computers, combinations thereof, and the like.

Host computer 390 communicates with VTS 300 via communication link 392 with a host-to-data interface 380 disposed within the virtual tape server 300. Communication link 392 comprises a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof. In certain embodiments, the host-to-data interface 380 comprises an IBM Enterprise Systems Connection (ESCON) and communication link 392 comprises a fiber optic local area network used to link mainframes to disk drives or other mainframes.

VTS 300 also communicates with direct access storage device (DASD) 310, a plurality of data storage devices 130/140 and library manager 160. Data storage devices 130 and 140, and library manager 160, are disposed within one or more data storage and retrieval systems, such as data storage and retrieval systems 100 (FIG. 1)/200 (FIG. 2). In certain embodiments, DASD 310 is integral with host 390. In certain embodiments, DASD 310 is integral with VTS 300. In certain embodiments, DASD 310 is integral with a data storage and retrieval system. In certain embodiments, DASD 310 is external to host 390, VTS 300, and the one or more data storage and retrieval systems in communication with VTS 300. In the embodiment of FIG. 3, library manager 160 communicates with data storage devices 130 and 140. In alternative embodiments, library manager 160 does not directly communicate with data storage devices 130/140.

VTS 300 further includes storage manager 320, such as the IBM Adstar® Distributed Storage Manager. Storage manager 320 controls the movement of data from DASD 310 to information storage media mounted in data storage devices 130 and 140. In certain embodiments, storage manager 320 includes an ADSM server 322 and an ADSM hierarchical storage manager client 324. Alternatively, server 322 and client 324 could each comprise an ADSM system. Information from DASD 310 is provided to data storage devices 130 and 140 via ADSM server 322 and SCSI adapter 385.

VTS 300 further includes autonomic controller 350. Autonomic controller 350 controls the operations of DASD 310 through the hierarchical storage manager (HSM) client 324, and the transfer of data between DASD 310 and data storage devices 130 and 140. Library manager 160 communicates with autonomic controller 350.

From the host computer 390 perspective, device daemons 370, 372, and 374 appear to comprise multiple data storage devices attached to the host-to-data interface 380. Information is communicated between DASD 310 and host 390 via storage manager 320 and one or more of device daemons 370, 372, and 374.

Host computer 390 comprises a computer system, such as a mainframe, personal computer, workstation, etc., including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 390 includes a storage management program 394 (not shown in FIG. 3). The storage management program 394 in the host computer 390 may include the functionality of storage management type programs known in the art that manage the transfer of data to a data storage and retrieval system, such as the IBM DFSMS implemented in the IBM MVS operating system.

The IBM DFSMS software is described in "z/OS V1R3 DFSMS Introduction," IBM document no. SC26-7397-01, which document is incorporated herein by reference in its entirety. Storage management program 394 may include known storage management program functions, such as recall and migration. The storage management program 394 may be implemented within the operating system of the host computer 390 or as a separate, installed application program. Alternatively, storage management program 394 may include device drivers, backup software, and the like.

Figure 1:
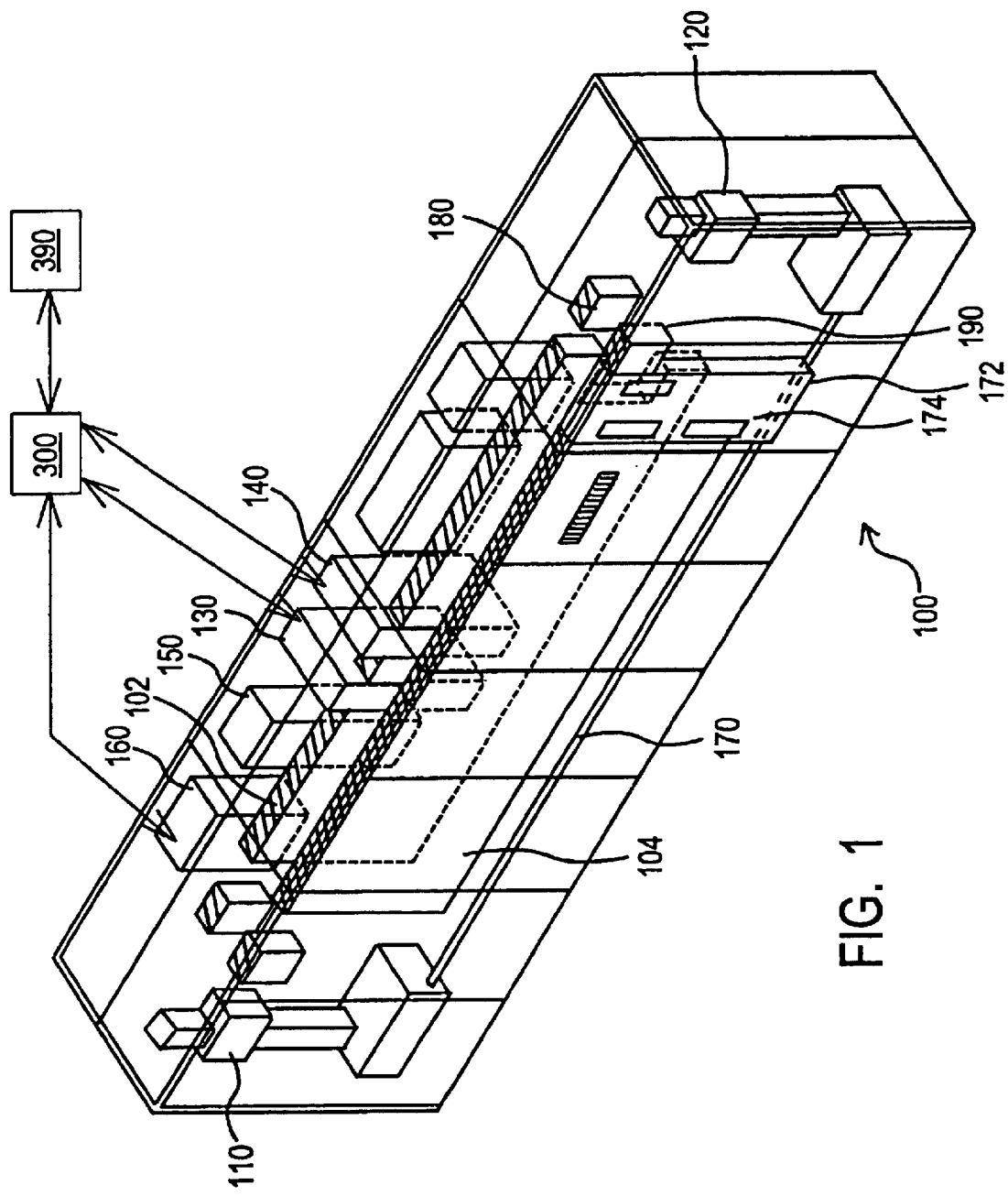
FIG. 1 is a perspective view of a first embodiment of Applicant's data storage and retrieval system.
Figure 2:
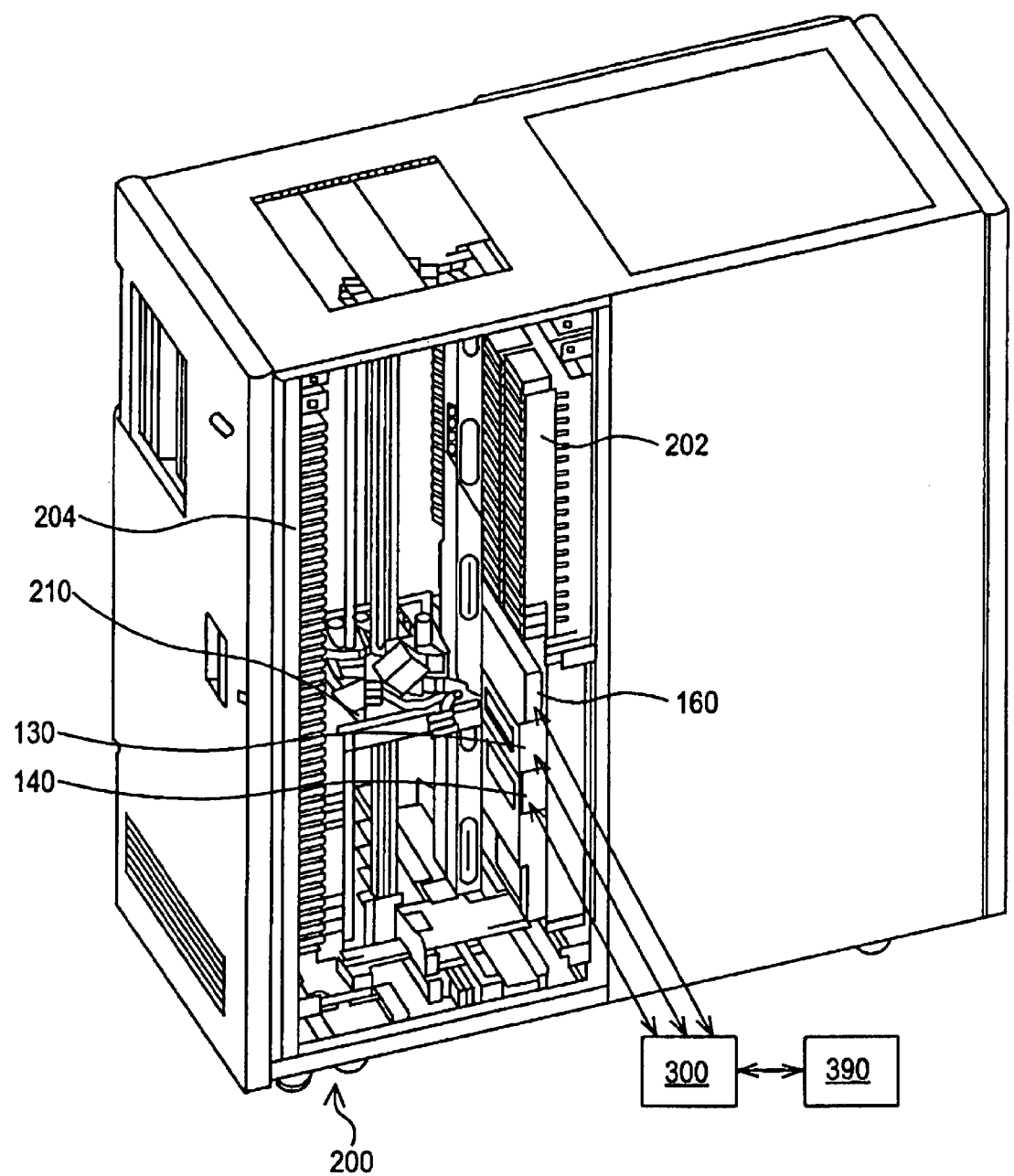
FIG. 2 is a perspective view of a second embodiment of Applicant's data storage and retrieval system.

Referring now to FIG. 1, automated data storage and retrieval system 100 is shown having a first wall of storage slots 102 and a second wall of storage slots 104. Portable data storage media are individually stored in these storage slots. In certain embodiments, such data storage media are individually housed in portable container, i.e. a cartridge. Examples of such data storage media include magnetic tapes, magnetic disks of various types, optical disks of various types, electronic storage media, and the like.

Applicant's automated data storage and retrieval system includes one or more accessors, such as accessors 110 and 120. An accessor is a robotic device which accesses portable data storage media from first storage wall 102 or second storage wall 104, transports that accessed media to data storage devices 130/140 for reading and/or writing data thereon, and returns the media to a proper storage slot. In certain embodiments, data storage devices 130 (FIGS. 1, 2, 3) and 140 (FIGS. 1, 2, 3) comprise IBM TotalStorage® 3590 tape drives and the portable information storage media comprise magnetic tapes housed in IBM TotalStorage® 3590 tape cartridges.

Device 160 comprises a library manager. In certain of these embodiments, library controller 160 is integral with a computer. Operator input station 150 permits a user to communicate with Applicant's automated data storage and retrieval system 100. Power component 180 and power component 190 each comprise one or more power supply units which supply power to the individual components disposed within Applicant's automated data storage and retrieval system. Import/export station 172 includes access door 174 pivotably attached to the side of system 100. Portable data storage cartridges can be placed in the system, or in the alternative, removed from the system, via station 172/access door 174.

FIG. 2 shows system 200 which comprises another embodiment of Applicant's data storage and retrieval system. System 200 includes first storage wall 202 and second storage wall 204. Storage walls 202 and 204 each include a plurality of storage elements in which can be stored a plurality of portable data storage media. System 200 includes two or more data storage devices, such as devices 130 and 140. Data storage device 130/140 each comprise a floppy disk drive, an optical disk drive, a magnetic tape drive, an electronic media drive, and the like. System 200 further includes controller 160. System 200 further includes operator control panel 150 (not shown in FIG. 2).

System 200 further includes one or a plurality of portable data storage cartridges removeably disposed in one or more slots in storage walls 202/204. Each such cartridge contains a data storage medium internally disposed therein. Such data storage media includes optical media, magnetic media, tape media, electronic media, and combinations thereof.

System 200 also includes at least one robotic accessor 210 for transporting a designated portable data storage medium between a storage slot disposed in first wall 202 or second wall 204 and data storage device 130/140.

Figure 4:
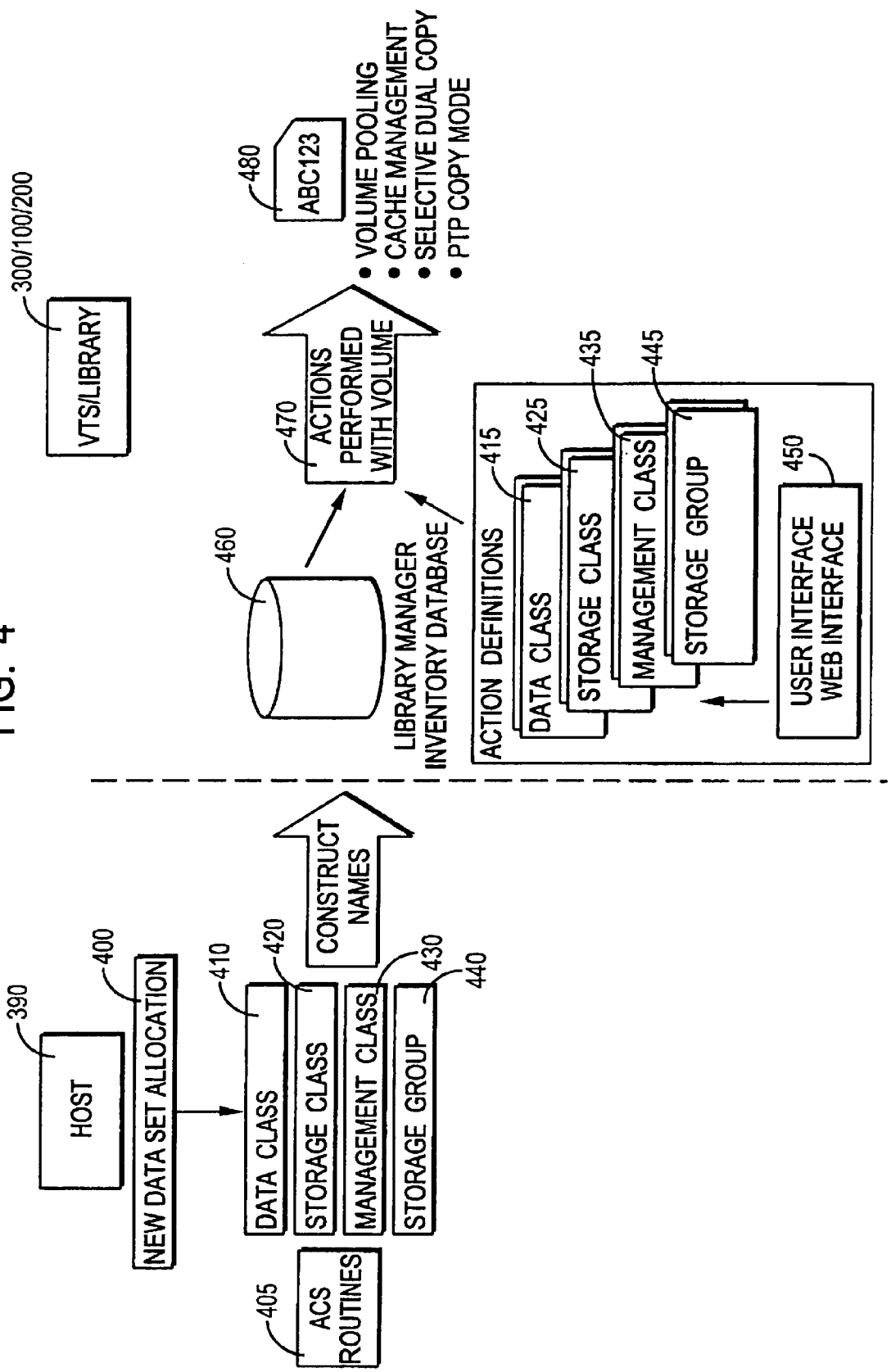
FIG. 4 is a block diagram showing passage of up to four storage construct names from a host computer to Applicants' virtual tape system.

FIG. 4 provides a graphical overview of Applicants' method to maintain information by assigning one or more storage construct names to a logical volume and assigning one or more storage attributes to that logical volume using those one or more storage construct names. Host computer 390 creates a new dataset 400. Host 390 includes a set of Automatic Class Selection ("ACS") routines which establish the data management policies for the new dataset, for one or more virtual volumes comprising that dataset, for writing those one or more virtual volumes to one or more physical volumes, and for management of those one or more volumes.

These ACS routines determine which information storage policies are assigned to each logical volume maintained by that host computer. These information policies include one or more data class policies 410, one or more storage class policies 420, one or more management class policies 430, and one or more storage group policies 440.

Data class storage policies include, for example, which recording format to use when writing volumes, which media cartridges to use, and the like. Storage class storage policies include, for example, whether to give the virtual volume preference to be removed or maintained on a DASD, such as DASD 310 (FIG. 3). Management class storage policies include, for example, whether a copy of the logical volume should be made immediately or whether to defer making that copy, selecting one or more information storage media to use when writing volumes, allocating a secondary stacked volume pool, and the like. Storage group storage policies include, for example, specifying a primary stacked volume pool for the logical volume, and the like.

After an ACS routine establishes a certain storage management policy for a logical volume, that ACS routine then assigns a storage construct name which indicates the selected storage management policy. In certain embodiments, each such storage construct name comprises an 8 byte designator.

In certain embodiments, host computer 390 (FIGS. 1, 2, 3, 4) comprises between zero and four ACS routines. In other embodiments, host computer 390 includes more than four ACS routines. In embodiments wherein host 390 includes four ACS routines, for example, host 390 may assign between zero and four storage construct names for new dataset 400. These zero to four storage construct names are passed by host 390 with new dataset 400 to an interconnected virtual tape system. Such an interconnected virtual tape system includes one or more virtual tape servers, such as VTS 300, and one or more data storage and retrieval systems, such as systems 100/200.

The virtual tape system includes a library manager, such a library manager 160 (FIGS. 1, 2). That library manager includes a library inventory 460. Library inventory 460 comprises a database. That inventory database 460 includes fields indicating the storage management policies selected for each virtual volume maintained on that virtual tape system. Thus, library database 460 includes a data class attribute field, a storage class attribute field, a management class attribute field, and a storage group attribute field.

Storage actions associated with each storage construct name are defined for a virtual tape system using an operator input station, such as operator input station 150 (FIG. 1), disposed in that virtual tape system. In certain embodiments, the operator input station is integral with the virtual tape server. In certain embodiments, the operator input station is integral with a data storage and retrieval system. In certain embodiments, the operator input station is remote from both the virtual tape server and the data storage and retrieval system. In these remote operator input station embodiments, operator input station 150 communicates with the virtual tape system using a serial interconnection, such as an RS-422 cable/RS-232 cable, a SCSI interconnection, an ethernet interconnection, a gigabit ethernet interconnection, a Fibre Channel interconnection, an ESCON interconnection, a local area network, a private wide area network, a public wide area network, a TCP/IP interconnection, combinations thereof, and the like.

When Applicants' virtual tape system writes a first file sequence to a logical volume, the storage construct names assigned to that virtual volume are stored in library inventory 460 as storage attributes assigned to that logical volume. If the virtual tape system subsequently accesses that logical volume, those storage attributes are recalled and used to determine storage management policies for that logical volume.

FIG. 5 summarizes the steps in certain embodiments of Applicants' method. Referring now to FIG. 5, in step 510 Applicants' method defines each of a plurality of storage construct names to indicate one or more requested storage management actions. In certain embodiments, one or more of these storage construct names are associated with each of the four information storage management policies described above.

In step 520, a host computer, such as host 390 (FIGS. 1, 2, 3, 4), forms a new dataset, such as dataset 400 (FIG. 4). Applicants' method transitions from step 520 to step 530 wherein the host assigns (N) construct names for the logical volume of step 510. In certain embodiments, (N) is zero. In alternative embodiments, (N) is selected from the group consisting of 1, 2, 3, and 4. In certain embodiments, (N) is greater than four. In certain embodiments, step 530 further includes using one or more automatic class selection routines to assign the (N) construct names.

Applicants' method transitions from step 530 to step 540 wherein the host computer sends a mount request to Applicants' virtual tape system. In step 540, the host computer provides the dataset of step 520 and the (N) construct names of step 530 to Applicants' virtual tape system. In certain embodiments, the mount request of step 540 comprises a Perform Library Function—Library Universal Mount command.

Figure 6A:
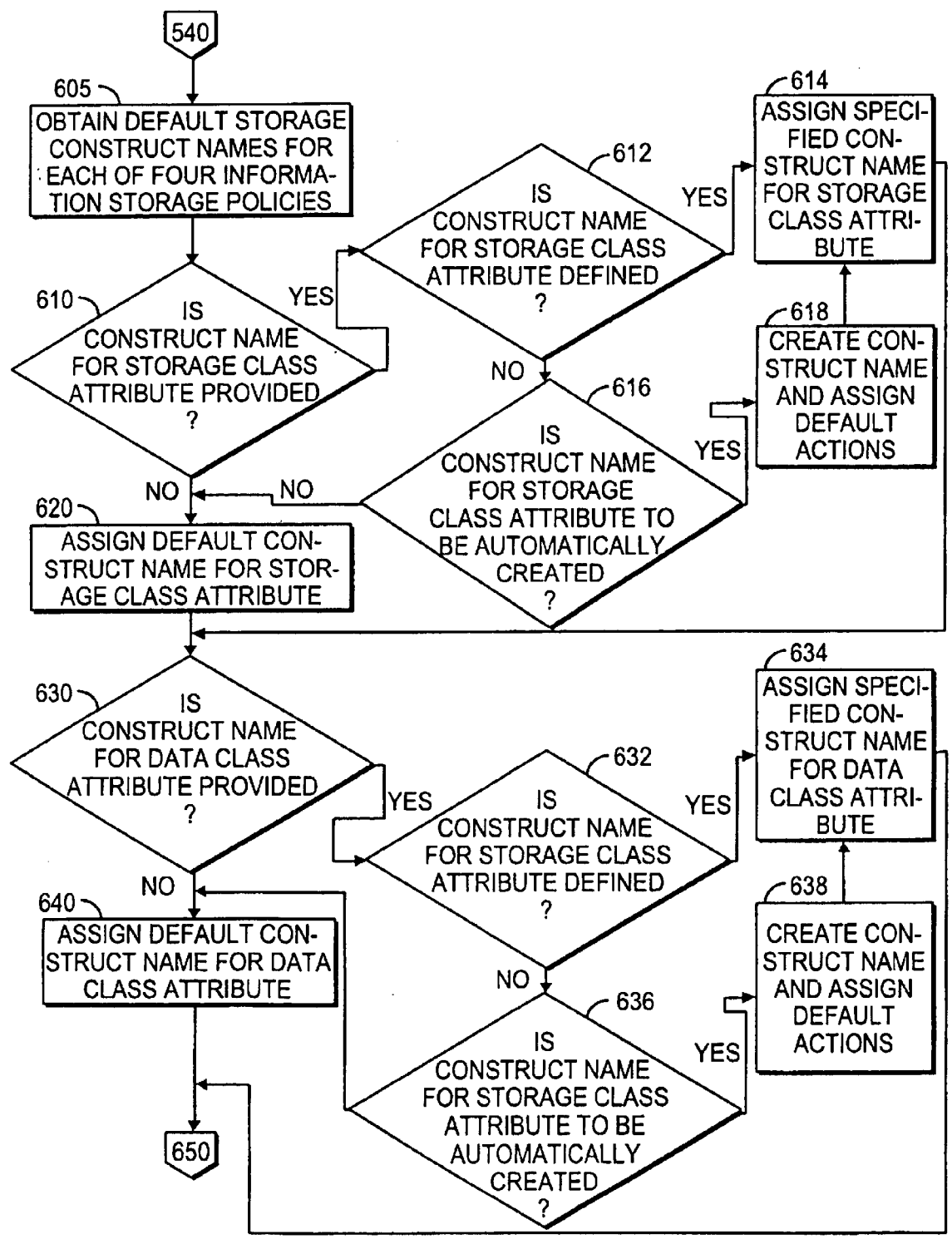
FIG. 6A is a flow chart summarizing additional steps in Applicants' method.
Figure 6B:
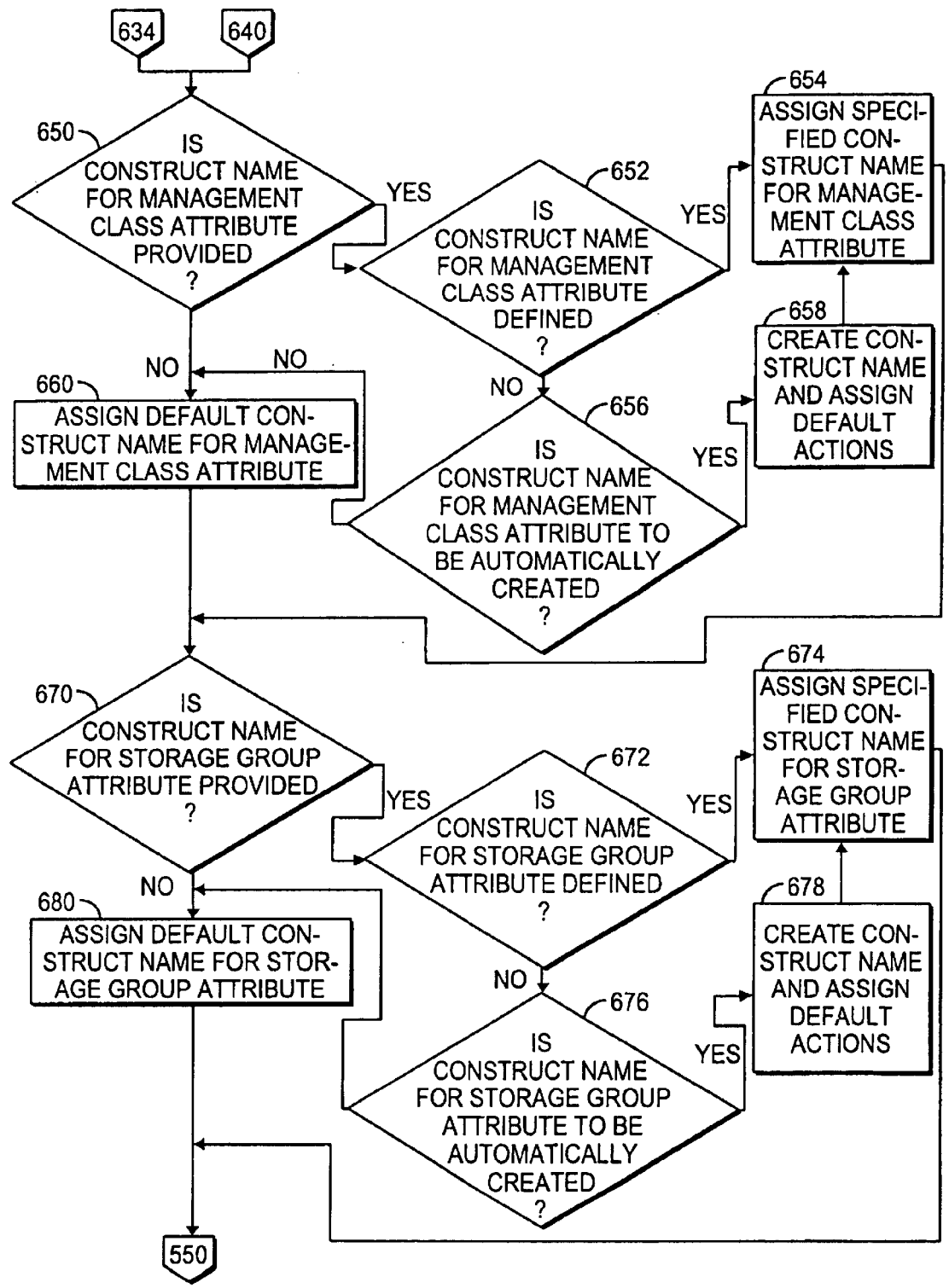
FIG. 6B is a flow chart summarizing additional steps in Applicants' method.

Applicants' method transitions from step 540 to step 605 (FIG. 6A). Referring now to FIG. 6A, in step 605 Applicants' method obtains (N) default storage construct names. In the certain embodiments, (N) is four. In certain embodiments, (N) is less than four. In certain embodiments, (N) is greater than 4. In the embodiment of FIGS. 6A and 6B, (N) is four.

In step 610, Applicants' method determines if the mount request of step 540 includes a storage class construct name. If Applicants' method determines in step 610 that a storage class construct name is not assigned, then Applicants' method transitions from step 610 to step 620 wherein Applicants' method assigns the default storage class construct name of step 605 to the logical volume. Applicant's method transitions from step 620 to step 630. Alternatively, if Applicants' method determines in step 610 that a storage class construct name is assigned, then Applicants' method transitions from step 610 to step 612 wherein Applicants' method determines if that assigned storage class construct name is defined.

If Applicant's method determines in step 612 that the assigned storage class construct name is defined, then Applicants' method transitions from step 612 to step 614 wherein Applicants' method assigns that storage class construct name as the storage class attribute for the logical volume. Alternatively, if Applicants' method determines in step 612 that the assigned storage class construct name is not defined, then Applicants' method transitions from step 612 to step 616 wherein Applicants' method determines if the undefined storage class construct name is to be automatically created. If Applicants' method determines in step 616 that the undefined storage class construct name is not to be automatically created, then Applicants' method transitions from step 616 to step 620. Alternatively, if Applicants' method determines in step 616 that the undefined storage class construct name is to be automatically created, then Applicants' method transitions from step 616 to step 618 wherein Applicants' method creates that storage class construct name and assigns default actions to that construct name. Applicants' method transitions from step 618 to step 614 where that newly created and defined storage class construct name is assigned as the storage class attribute for the logical volume. Applicants' method transitions from step 614 to step 630.

In step 630, Applicants' method determines if the mount request of step 540 includes a data class construct name. If Applicants' method determines in step 630 that a data class construct name is not assigned, then Applicants' method transitions from step 630 to step 640 wherein Applicants' method assigns the default data class construct name of step 605 to the logical volume. Applicant's method transitions from step 640 to step 650. Alternatively, if Applicants' method determines in step 630 that a data class construct name is assigned, then Applicants' method transitions from step 630 to step 632 wherein Applicants' method determines if that assigned data class construct name is defined.

If Applicant's method determines in step 632 that the assigned data class construct name is defined, then Applicants' method transitions from step 632 to step 634 wherein Applicants' method assigns that data class construct name as the data class attribute for the logical volume. Alternatively, if Applicants' method determines in step 632 that the assigned data class construct name is not defined, then Applicants' method transitions from step 632 to step 636 wherein Applicants' method determines if the undefined data class construct name is to be automatically created. If Applicants' method determines in step 636 that the undefined data class construct name is not to be automatically created, then Applicants' method transitions from step 636 to step 640. Alternatively, if Applicants' method determines in step 636 that the undefined data class construct name is to be automatically created, then Applicants' method transitions from step 636 to step 638 wherein Applicants' method creates that data class construct name and assigns default actions to that construct name. Applicants' method transitions from step 638 to step 634 where that newly created and defined data class construct name is assigned as the data class attribute for the logical volume. Applicants' method transitions from step 634 to step 650 (FIG. 6B).

Referring now to FIG. 6B, in step 650, Applicants' method determines if the mount request of step 540 includes a management class construct name. If Applicants' method determines in step 650 that a management class construct name is not assigned, then Applicants' method transitions from step 650 to step 660 wherein Applicants' method assigns the default management class construct name of step 605 to the logical volume. Applicant's method transitions from step 660 to step 670. Alternatively, if Applicants' method determines in step 650 that a management class construct name is assigned, then Applicants' method transitions from step 650 to step 652 wherein Applicants' method determines if that assigned management class construct name is defined.

If Applicant's method determines in step 652 that the assigned management class construct name is defined, then Applicants' method transitions from step 652 to step 654 wherein Applicants' method assigns that management class construct name as the management class attribute for the logical volume. Alternatively, if Applicants' method determines in step 652 that the assigned management class construct name is not defined, then Applicants' method transitions from step 652 to step 656 wherein Applicants' method determines if the undefined management class construct name is to be automatically created. If Applicants' method determines in step 656 that the undefined management class construct name is not to be automatically created, then Applicants' method transitions from step 656 to step 660. Alternatively, if Applicants' method determines in step 656 that the undefined management class construct name is to be automatically created, then Applicants' method transitions from step 656 to step 658 wherein Applicants' method creates that management class construct name and assigns default actions to that construct name. Applicants' method transitions from step 658 to step 654 wherein that newly created and defined management class construct name is assigned as the management class attribute for the logical volume. Applicants' method transitions from step 654 to step 670.

In step 670, Applicants' method determines if the mount request of step 540 includes a storage group construct name. If Applicants' method determines in step 670 that a storage group construct name is not assigned, then Applicants' method transitions from step 670 to step 680 wherein Applicants' method assigns the default storage group construct name of step 605 to the logical volume. Applicant's method transitions from step 680 to step 550 (FIG. 5). Alternatively, if Applicants' method determines in step 670 that a storage group construct name is assigned, then Applicants' method transitions from step 670 to step 672 wherein Applicants' method determines if that assigned storage group construct name is defined.

If Applicant's method determines in step 672 that the assigned storage group construct name is defined, then Applicants' method transitions from step 672 to step 674 wherein Applicants' method assigns that storage group construct name as the storage group attribute for the logical volume. Alternatively, if Applicants' method determines in step 672 that the assigned storage group construct name is not defined, then Applicants' method transitions from step 672 to step 676 wherein Applicants' method determines if the undefined storage group construct name is to be automatically created. If Applicants' method determines in step 676 that the undefined storage group construct name is not to be automatically created, then Applicants' method transitions from step 676 to step 680. Alternatively, if Applicants' method determines in step 676 that the undefined storage group construct name is to be automatically created, then Applicants' method transitions from step 676 to step 678 wherein Applicants' method creates that storage group construct name and assigns default actions to that construct name. Applicants' method transitions from step 678 to step 674 where that newly created and defined storage group construct name is assigned as the storage group attribute for the logical volume. Applicants' method transitions from step 674 to step 550 (FIG. 5).

Referring again to FIG. 5, in step 550 Applicants' method stores in the library inventory the (N) construct names of step 530 as (N) storage attributes assigned to the logical volume comprising the dataset of step 520. In certain embodiments, Applicants' method transitions from step 550 to step 580 wherein Applicants' method selects one or more storage management actions for the logical volume based upon the storage attributes of step 560. Applicants' method transitions from step 580 to step 590 wherein Applicants' method process the logical volume using the selected management actions of step 580.

In certain embodiments, Applicants' method transitions from step 550 to step 560 wherein the host computer updates the logical volume's storage attributes. In certain embodiments, step 560 includes using a Perform Library Function—Library Set Volume Attributes command. Applicants' method transitions from step 560 to step 580 wherein Applicants' method selects one or more storage management actions for the logical volume based upon the updated storage attributes of step 560.

Each time subsequent to the initial processing of the logical volume that Applicants' virtual tape system accesses the logical volume, in step 570 Applicants' method retrieves from the library inventory the storage attributes assigned to that logical volume. Applicants' method transitions from step 570 to step 580.

The embodiments of Applicants' method recited in FIGS. 5 and/or 6 may be implemented separately. For example, one embodiment may include only the steps of FIG. 5. Moreover, in certain embodiments, the individual steps recited in FIGS. 5 and/or 6 may be combined, eliminated, or reordered.

Applicants' invention includes an article of manufacture comprising a computer useable medium having computer readable program code disposed therein for maintaining information using a plurality of storage attributes. Applicants' invention further includes computer program products embodied as program code stored in one or more memory devices, such as a magnetic disk, a magnetic tape, or other non-volatile memory device, to maintain information using a plurality of storage attributes.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to maintain information using a plurality of storage attributes, comprising steps of:
    forming a dataset;
    assigning four storage construct names to said dataset;
    providing a virtual tape system comprising a library inventory;
    providing said dataset and said four storage construct names to said virtual tape system;
    forming a logical volume comprising said dataset;
    assigning four storage attributes to said logical volume, wherein said four storage attributes comprise a storage class attribute, a data class attribute, a management class attribute, and a storage group attribute;
    including a storage class attribute field in said library inventory;
    including a data class attribute field in said library inventory;
    including a management class attribute field in said library inventory;
    including a storage group attribute field in said library inventory;
    storing at a first time said assigned storage attributes in said library inventory;
    retrieving at a second time said assigned storage attributes from said library inventory;
    selecting storage management actions for said logical volume based upon said assigned storage attributes.

2. The method of claim 1, further comprising the steps of:
    defining a plurality of storage class construct names, and a default storage class construct name;
    defining a plurality of data class construct names, and a default data class construct name;
    defining a plurality of management class construct names, and a default management class construct name; and
    defining a plurality of storage group construct name, and a default storage group construct name.

3. The method of claim 2, wherein said (four) storage construct names comprise:
    one of said plurality of storage class construct names;
    one of said plurality of data class construct names;
    one of said plurality of management class construct names; and
    one of said plurality of storage group construct names.

4. The method of claim 3, further comprising the steps of:
    determining if said logical volume comprises an assigned data class construct name;
    operative if said logical volume does not comprise an assigned data class construct name, assigning said default data class construct name as the data class attribute for said logical volume;
    operative if said logical volume comprises an assigned data class construct name, determining if said assigned data class construct name is defined;
    operative if said assigned data class construct name is defined, assigning said specified data class construct name as the data class attribute for said logical volume;
    operative if said assigned data class construct name is not defined, determining if said undefined data class construct name is to be created;
    operative if said undefined data class construct name is to be created, creating said undefined data class construct name, assigning default actions thereto, and assigning said created data class construct name as the data class attribute for said logical volume,
    operative if said undefined data class construct name is not to be created, assigning said default data class construct name as the data class attribute for said logical volume;
    determining if said logical volume comprises an assigned storage class construct name;
    operative if said logical volume does not comprise an assigned storage class construct name, assigning said default storage class construct name as the storage class attribute for said logical volume;
    operative if said logical volume comprises an assigned storage class construct name, determining if said assigned storage class construct name is defined;
    operative if said assigned storage class construct name is defined, assigning said assigned storage class construct name as the storage class attribute for said logical volume;
    operative if said assigned storage class construct name is not defined, determining if said undefined storage class construct name is to be created;
    operative if said undefined storage class construct name is to be created, creating said undefined storage class construct name, assigning default actions thereto, and assigning said created storage class construct name as the storage class attribute for said logical volume,
    operative if said undefined storage class construct name is not to be created, assigning said default storage class construct name as the storage class attribute for said logical volume;
    determining if said logical volume comprises an assigned management class construct name;
    operative if said logical volume does not comprise an assigned management class construct name, assigning said default management class construct name as the management class attribute for said logical volume;
    operative if said logical volume comprises an assigned management class construct name, determining if said assigned management class construct name is defined;

operative if said assigned management class construct name is defined, assigning said specified management class construct name as the management class storage attribute for said logical volume;

operative if said assigned management class construct name is not defined, determining if said undefined management class construct name is to be created;

operative if said undefined management class construct name is to be created, creating said undefined management class construct name, assigning default actions thereto, and assigning said created management class construct name as the management class storage attribute for said logical volume, operative if said undefined management class construct name is not to be created, assigning said default management class construct name as the management class storage attribute for said logical volume;

determining if said logical volume comprises an assigned storage group construct name;

operative if said logical volume does not comprise an assigned storage group construct name, assigning said default storage group construct name as the storage group storage attribute for said logical volume;

operative if said logical volume comprises an assigned storage group construct name, determining if said assigned storage group construct name is defined;

operative if said assigned storage group construct name is defined, assigning said specified storage group construct name as the storage group storage attribute for said logical volume;

operative if said assigned storage group construct name is not defined, determining if said undefined storage group construct name is to be created;

operative if said undefined storage group construct name is to be created, creating said undefined storage group construct name, assigning default actions thereto, and assigning said created storage group construct name as the storage group storage attribute for said logical volume, operative if said undefined storage group construct name is not to be created, assigning said default storage group construct name as the storage group storage attribute for said logical volume.

5. The method of claim 1, further comprising:

providing a host computer capable of communicating with said virtual tape system;

sending a mount request by said host computer to said virtual tape system, wherein said mount request comprises said dataset and said (N) storage construct names.

6. The method of claim 5, wherein said mount request comprises a Perform Library Function—Library Universal Mount command.

7. A method to maintain information using a plurality of storage attributes, comprising the steps of:

providing a virtual tape system comprising a library inventory;

including a storage class attribute field in said library inventory;

forming a plurality of storage class construct names;

forming a default storage class construct name;

defining each of said plurality of storage class construct names and said default storage class construct name;

including a data class attribute field in said library inventory;

forming a plurality of data class construct names;

forming a default data class construct name;

defining each of said plurality of data class construct names and said default data class construct name;

including a management class attribute field in said library inventory;

forming a plurality of management class construct names;

forming a default management class construct name;

defining each of said plurality of management class construct names and said default management class construct name;

including a storage group attribute field in said library inventory;

forming a plurality of storage group construct names;

forming a default storage group construct name;

defining each of said plurality of storage group construct names and said default storage group construct name;

forming a logical dataset;

assigning (N) construct names to said dataset, wherein (N) is greater than or equal to 0 and less than or equal to 4;

providing said dataset and said (N) construct names to said virtual tape system;

writing said dataset to a logical volume;

determining if said logical volume comprises an assigned data class construct name;

operative if said logical volume does not comprise an assigned data class construct name, assigning said default data class construct name as the data class attribute for said logical volume;

operative if said logical volume comprises an assigned data class construct name, determining if said assigned data class construct name is defined;

operative if said assigned data class construct name is defined, assigning said specified data class construct name as the data class attribute for said logical volume;

operative if said assigned data class construct name is not defined, assigning said default data class construct name as the data class attribute for said logical volume;

determining if said logical volume comprises an assigned storage class construct name;

operative if said logical volume does not comprise an assigned storage class construct name, assigning said default storage class construct name as the storage class attribute for said logical volume;

operative if said logical volume comprises an assigned storage class construct name, determining if said assigned storage class construct name is defined;

operative if said assigned storage class construct name is defined, assigning said assigned storage class construct name as the storage class attribute for said logical volume;

operative if said assigned storage class construct name is not defined, assigning said default storage class construct name as the storage class attribute for said logical volume;

determining if said logical volume comprises an assigned management class construct name;

operative if said logical volume does not comprise an assigned management class construct name, assigning said default management class construct name as the management class attribute for said logical volume;

operative if said logical volume comprises an assigned management class construct name, determining if said assigned management class construct name is defined;

operative if said assigned management class construct name is defined, assigning said specified management class construct name as the management class attribute for said logical volume;

operative if said assigned management class construct name is not defined, assigning said default management class construct name as the management class attribute for said volume; logical volume;

determining if said logical volume comprises an assigned storage group construct name;

operative if said logical volume does not comprise an assigned storage group construct name, assigning said default storage group construct name as the storage group attribute for said logical volume;

operative if said logical volume comprises an assigned storage group construct name, determining if said assigned storage group construct name is defined;

operative if said assigned storage group construct name is defined, assigning said specified storage group construct name as the storage group attribute for said logical volume;

operative if said assigned storage group construct name is not defined, assigning said default storage group construct name as the storage group attribute for said logical volume;

storing at a first time said storage class attribute, said data class attribute, said management class attribute, and said storage group attribute, in said library inventory;

retrieving at a second time said storage class attribute, said data class attribute, said management class attribute, and said storage group attribute, from said library inventory; and selecting management actions for said logical volume based upon said retrieved storage attributes.

8. An article of manufacture comprising a library inventory and a computer useable medium having computer readable program code disposed therein to maintain information using a plurality of storage attributes, the computer readable program code comprising a series of computer readable program steps to effect:

receiving a dataset and four storage construct names assigned to said dataset;

forming a logical volume comprising said dataset;

assigning four storage attributes to said logical volume, wherein said four storage attributes comprise a storage class attribute, a data class attribute, a management class attribute, and a storage group attribute;

including a storage class attribute field in said library inventory;

including a data class attribute field in said library inventory;

including a management class attribute field in said library inventory;

including a storage group attribute field in said library inventory;

storing at a first time said assigned storage attributes in said library inventory;

retrieving at a second time said assigned storage attributes from said library inventory;

selecting storage management actions for said logical volume based upon said assigned storage attributes.

9. The article of manufacture of claim 8, said computer readable program code further comprising a series of computer readable program steps to effect:

defining a plurality of storage class construct names and a default storage class construct name;

defining a plurality of data class construct names and a default data class construct name;

defining a plurality of management class construct names and a default management class construct name; and defining a plurality of storage group construct names and a default storage group construct name.

10. The article of manufacture of claim 9, wherein said (four) storage construct names comprise:

one of said plurality of storage class construct names;

one of said plurality of data class construct names;

one of said plurality of management class construct names; and one of said plurality of storage group construct names.

11. The article of manufacture of claim 10, said computer readable program code further comprising a series of computer readable program steps to effect:

determining if said logical volume comprises an assigned data class construct name;

operative if said logical volume does not comprise an assigned data class construct name, assigning said default data class construct name as the data class attribute for said logical volume;

operative if said logical volume comprises an assigned data class construct name, determining if said assigned data class construct name is defined;

operative if said assigned data class construct name is defined, assigning said specified data class construct name as the data class attribute for said logical volume;

operative if said assigned data class construct name is not defined, determining if said undefined data class construct name is to be created;

operative if said undefined data class construct name is to be created, creating said undefined data class construct name, assigning default actions thereto, and assigning said created data class construct name as the data class attribute for said logical volume, operative if said undefined data class construct name is not to be created, assigning said default data class construct name as the data class attribute for said logical volume;

determining if said logical volume comprises an assigned storage class construct name;

operative if said logical volume does not comprise an assigned storage class construct name, assigning said default storage class construct name as the storage class attribute for said logical volume;

operative if said logical volume comprises an assigned storage class construct name, determining if said assigned storage class construct name is defined;

operative if said assigned storage class construct name is defined, assigning said assigned storage class construct name as the storage class attribute for said logical volume;

operative if said assigned storage class construct name is not defined, assigning said default storage class construct name as the storage class attribute for said logical volume;

determining if said logical volume comprises an assigned management class construct name;

operative if said logical volume does not comprise an assigned management class construct name, assigning said default management class construct name as the management class attribute for said logical volume;

operative if said logical volume comprises an assigned management class construct name, determining if said assigned management class construct name is defined;

operative if said assigned management class construct name is defined, assigning said specified management class construct name as the management class attribute for said logical volume;

operative if said assigned management class construct name is not defined, assigning said default management class construct name as the management class attribute for said logical volume;

determining if said logical volume comprises an assigned storage group construct name;

operative if said logical volume does not comprise an assigned storage group construct name, assigning said default storage group construct name as the storage group attribute for said logical volume;

operative if said logical volume comprises an assigned storage group construct name, determining if said assigned storage group construct name is defined;

operative if said assigned storage group construct name is defined, assigning said specified storage group construct name as the storage group attribute for said logical volume;

operative if said assigned storage group construct name is not defined, assigning said default storage group construct name as the storage group attribute for said logical volume.

12. The article of manufacture of claim 8, said computer readable program code further comprising a series of computer readable program steps to effect receiving a mount request from a host computer, wherein said mount request comprises said dataset and said (N) storage construct names.

13. The article of manufacture of claim 12, wherein said mount request comprises a Perform Library Function—Library Universal Mount command.

14. An article of manufacture comprising a computer useable medium having computer readable program code disposed therein to maintain information using a plurality of storage attributes and a virtual tape system comprising a library inventory, wherein said library inventory comprises a storage class attribute field, a data class attribute field, a management class attribute field, and a storage group attribute field, the computer readable program code comprising a series of computer readable program steps to effect:

forming a plurality of storage class construct names;

forming a default storage class construct name;

defining each of said plurality of storage class construct names and said default storage class construct name;

forming a plurality of data class construct names;

forming a default data class construct name;

defining each of said plurality of data class construct names and said default data class construct name;

forming a plurality of management class construct names;

forming a default management class construct name;

defining each of said plurality of management class construct names and said default management class construct name;

forming a plurality of storage group construct names;

forming a default storage group construct name;

defining each of said plurality of storage group construct names and said default storage group construct name;

receiving a dataset;

writing said dataset to a logical volume;

receiving (N) storage construct names assigned to said logical volume, wherein (N) is greater than or equal to 0 and less than or equal to 4;

determining if said logical volume comprises an assigned data class construct name;

operative if said logical volume does not comprise an assigned data class construct name, assigning said default data class construct name as the data class attribute for said logical volume;

operative if said logical volume comprises an assigned data class construct name, determining if said assigned data class construct name is defined;

operative if said assigned data class construct name is defined, assigning said specified data class construct name as the data class attribute for said logical volume;

operative if said assigned data class construct name is not defined, assigning said default data class construct name as the data class attribute for said logical volume;

determining if said logical volume comprises an assigned storage class construct name;

operative if said logical volume does not comprise an assigned storage class construct name, assigning said default storage class construct name as the storage class attribute for said logical volume;

operative if said logical volume comprises an assigned storage class construct name, determining if said assigned storage class construct name is defined;

operative if said assigned storage class construct name is defined, assigning said assigned storage class construct name as the storage class attribute for said logical volume;

operative if said assigned storage class construct name is not defined, assigning said default storage class construct name as the storage class attribute for said logical volume;

determining if said logical volume comprises an assigned management class construct name;

operative if said logical volume does not comprise an assigned management class construct name, assigning said default management class construct name as the management class attribute for said logical volume;

operative if said logical volume comprises an assigned management class construct name, determining if said assigned management class construct name is defined;

operative if said assigned management class construct name is defined, assigning said specified management class construct name as the management class attribute for said logical volume;

operative if said assigned management class construct name is not defined, assigning said default management class construct name as the management class attribute for said logical volume;

determining if said logical volume comprises an assigned storage group construct name;

operative if said logical volume does not comprise an assigned storage group construct name, assigning said default storage group construct name as the storage group attribute for said logical volume;

operative if said logical volume comprises an assigned storage group construct name, determining if said assigned storage group construct name is defined;

operative if said assigned storage group construct name is defined, assigning said specified storage group construct name as the storage group attribute for said logical volume;

operative if said assigned storage group construct name is not defined, assigning said default storage group construct name as the storage group attribute for said logical volume;

storing at a first time said storage class attribute, said data class attribute, said management class attribute, and said storage group attribute, in said library inventory;

retrieving at a second time said storage class attribute, said data class attribute, said management class attribute, and said storage group attribute, from said library inventory; and selecting management actions for said logical volume based upon said retrieved storage attributes.

15. A computer program product usable with a programmable computer processor having computer readable program code embodied therein to maintain information using a plurality of storage attributes, comprising:

computer readable program code which causes said programmable computer processor to receive a dataset and four storage construct names assigned said dataset;

computer readable program code which causes said programmable computer processor to write said dataset to a logical volume;

computer readable program code which causes said programmable computer processor to assign a data class attribute to said logical volume;

computer readable program code which causes said programmable computer processor to assign a management class attribute to said logical volume;

computer readable program code which causes said programmable computer processor to assign a storage class attribute to said logical volume;

computer readable program code which causes said programmable computer processor to assign a storage group attribute to said logical volume;

computer readable program code which causes said programmable computer processor to store at a first time said storage attributes in said library inventory;

computer readable program code which causes said programmable computer processor to retrieve at a second time said storage attributes from said library inventory;

computer readable program code which causes said programmable computer processor to select storage management actions for said logical volume based upon said four storage attributes.

16. The computer program product of claim 15, further comprising:

computer readable program code which causes said programmable computer processor to define a plurality of storage class construct names and a default storage class construct name;

computer readable program code which causes said programmable computer processor to define a plurality of data class construct names and a default data class construct name;

computer readable program code which causes said programmable computer processor to define a plurality of management class construct names and a default management class construct name; and computer readable program code which causes said programmable computer processor to define a plurality of storage group construct name and a default storage group construct name.

17. The computer program product of claim 16, wherein said (four) storage construct names comprise:

one of said plurality of storage class construct names;

one of said plurality of data class construct names;

one of said plurality of management class construct names; and one of said plurality of storage group construct names.

18. The computer program product of claim 17, further comprising:

computer readable program code which causes said programmable computer processor to determine if said logical volume comprises an assigned data class construct name;

computer readable program code which, if said logical volume does not comprise an assigned data class construct name, causes said programmable computer processor to assign said default data class construct name as the data class attribute for said logical volume;

computer readable program code which, if said logical volume comprises an assigned data class construct name, causes said programmable computer processor to determine if said assigned data class construct name is defined;

computer readable program code which, if said assigned data class construct name is defined, causes said programmable computer processor to assign said specified data class construct name as the data class attribute for said logical volume;

computer readable program code which, if said assigned data class construct name is not defined, causes said programmable computer processor to determine if said undefined data class construct name is to be created;

computer readable program code which, if said undefined data class construct name is to be created, causes said programmable computer processor to create said undefined data class construct name, assign default actions thereto, and assign said created data class construct name as the data class attribute for said logical volume;

computer readable program code which, if said undefined data class construct name is not to be created, causes said programmable computer processor to assign said default data class construct name as the data class attribute for said logical volume;

computer readable program code which causes said programmable computer processor to determine if said logical volume comprises an assigned storage class construct name;

computer readable program code which, if said logical volume does not comprise an assigned storage class construct name, causes said programmable computer processor to assign said default storage class construct name as the storage class attribute for said logical volume;

computer readable program code which, if said logical volume comprises an assigned storage class construct name, causes said programmable computer processor to determine if said assigned storage class construct name is defined;

computer readable program code which, if said assigned storage class construct name is defined, causes said programmable computer processor to assign said assigned storage class construct name as the storage class attribute for said logical volume;

computer readable program code which, if said assigned storage class construct name is not defined, causes said programmable computer processor to determine if said undefined storage class construct name is to be created;

computer readable program code which, if said undefined storage class construct name is to be created, causes said programmable computer processor to create said undefined storage class construct name, assign default actions thereto, and assign said created storage class construct name as the storage class attribute for said logical volume;

computer readable program code which, if said undefined storage class construct name is not to be created, causes said programmable computer processor to assign said default storage class construct name as the storage class attribute for said logical volume;

computer readable program code which causes said programmable computer processor to determine if said logical volume comprises an assigned management class construct name;

computer readable program code which, if said logical volume does not comprise an assigned management class construct name, causes said programmable computer processor to assign said default management class construct name as the management class attribute for said logical volume;

computer readable program code which, if said logical volume comprises an assigned management class construct name, causes said programmable computer processor to determine if said assigned management class construct name is defined;

computer readable program code which, if said assigned management class construct name is defined, causes said programmable computer processor to assign said specified management class construct name as the management class attribute for said logical volume;

computer readable program code which, if said assigned management class construct name is not defined, causes said programmable computer processor to determine if said undefined management class construct name is to be created;

computer readable program code which, if said undefined management class construct name is to be created, causes said programmable computer processor to create said undefined management class construct name, assign default actions thereto, and assign said created management class construct name as the management class attribute for said logical volume;

computer readable program code which, if said undefined management class construct name is not to be created, causes said programmable computer processor to assign said default management class construct name as the management class attribute for said logical volume;

computer readable program code which causes said programmable computer processor to determine if said logical volume comprises an assigned storage group construct name;

computer readable program code which, if said logical volume does not comprise an assigned storage group construct name, causes said programmable computer processor to assign said default storage group construct name as the storage group attribute for said logical volume;

computer readable program code which, if said logical volume comprises an assigned storage group construct name, causes said programmable computer processor to determine if said assigned storage group construct name is defined;

computer readable program code which, if said assigned storage group construct name is defined, causes said programmable computer processor to assign said specified storage group construct name as the storage group attribute for said logical volume;

computer readable program code which, if said assigned storage group construct name is not defined, causes said programmable computer processor to determine if said undefined storage group construct name is to be created;

computer readable program code which, if said undefined storage group construct name is to be created, causes said programmable computer processor to create said undefined storage group construct name, assign default actions thereto, and assign said created storage group construct name as the storage group attribute for said logical volume;

computer readable program code which, if said undefined storage group construct name is not to be created, causes said programmable computer processor to assign said default storage group construct name as the storage group attribute for said logical volume.

19. The computer program product of claim 15, further comprising:

computer readable program code which causes said programmable computer processor to receive a mount request from a host computer, wherein said mount request comprises said dataset and said (N) storage construct names.

20. The computer program product of claim 19, wherein said mount request comprises a Perform Library Function—Library Universal Mount command.

21. A computer program product usable with a programmable computer processor having computer readable program code embodied therein to maintain information using a plurality of storage attributes and a virtual tape system comprising a library inventory, wherein said library inventory comprises a storage class attribute field, a data class attribute field, a management class attribute field, and a storage group attribute field, comprising:

computer readable program code which causes said programmable computer processor to form a plurality of storage class construct names;

computer readable program code which causes said programmable computer processor to form a default storage class construct name;

computer readable program code which causes said programmable computer processor to define each of said plurality of storage class construct names and said default storage class construct name;

computer readable program code which causes said programmable computer processor to form a plurality of data class construct names;

computer readable program code which causes said programmable computer processor to form a default data class construct name;

computer readable program code which causes said programmable computer processor to define each of said plurality of data class construct names and said default data class construct name;

computer readable program code which causes said programmable computer processor to form a plurality of management class construct names;

computer readable program code which causes said programmable computer processor to form a default management class construct name;

computer readable program code which causes said programmable computer processor to define each of said plurality of management class construct names and said default management class construct name;

computer readable program code which causes said programmable computer processor to form a plurality of storage group construct names;

computer readable program code which causes said programmable computer processor to form a default storage group construct name;

computer readable program code which causes said programmable computer processor to define each of said plurality of storage group construct names and said default storage group construct name;

computer readable program code which causes said programmable computer processor to receive a dataset;

computer readable program code which causes said programmable computer processor to receive (N) storage construct names assigned to said dataset, wherein (N) is greater than or equal to 0 and less than or equal to 4;

computer readable program code which causes said programmable computer processor to write said dataset to a logical volume;

computer readable program code which causes said programmable computer processor to determine if said logical volume comprises an assigned data class construct name;

computer readable program code which, if said logical volume does not comprise an assigned data class construct name, causes said programmable computer processor to assign said default data class construct name as the data class attribute for said logical volume;

computer readable program code which, if said logical volume comprises an assigned data class construct name, causes said programmable computer processor to determine if said assigned data class construct name is defined;

computer readable program code which, if said assigned data class construct name is defined, causes said programmable computer processor to assign said specified data class construct name as the data class attribute for said logical volume;

computer readable program code which, if said assigned data class construct name is not defined, causes said programmable computer processor to assign said default data class construct name as the data class attribute for said logical volume;

computer readable program code which causes said programmable computer processor to determine if said logical volume comprises an assigned storage class construct name;

computer readable program code which, if said logical volume does not comprise an assigned storage class construct name, causes said programmable computer processor to assign said default storage class construct name as the storage class attribute for said logical volume;

computer readable program code which, if said logical volume comprises an assigned storage class construct name, causes said programmable computer processor to determine if said assigned storage class construct name is defined;

computer readable program code which, if said assigned storage class construct name is defined, causes said programmable computer processor to assign said assigned storage class construct name as the storage class attribute for said logical volume;

computer readable program code which, if said assigned storage class construct name is not defined, causes said programmable computer processor to assign said default storage class construct name as the storage class attribute for said logical volume;

computer readable program code which causes said programmable computer processor to determine if said logical volume comprises an assigned management class construct name;

computer readable program code which, if said logical volume does not comprise an assigned management class construct name, causes said programmable computer processor to assign said default management class construct name as the management class attribute for said logical volume;

computer readable program code which, if said logical volume comprises an assigned management class construct name, causes said programmable computer processor to determine if said assigned management class construct name is defined;

computer readable program code which, if said assigned management class construct name is defined, causes said programmable computer processor to assign said specified management class construct name as the management class attribute for said logical volume;

computer readable program code which, if said assigned management class construct name is not defined, causes said programmable computer processor to assign said default management class construct name as the management class attribute for said logical volume;

computer readable program code which causes said programmable computer processor to determine if said logical volume comprises an assigned storage group construct name;

computer readable program code which, if said logical volume does not comprise an assigned storage group construct name, causes said programmable computer processor to assign said default storage group construct name as the storage group attribute for said logical volume;

computer readable program code which, if said logical volume comprises an assigned storage group construct name, causes said programmable computer processor to determine if said assigned storage group construct name is defined;

computer readable program code which, if said assigned storage group construct name is defined, causes said programmable computer processor to assign said specified storage group construct name as the storage group attribute for said logical volume;

computer readable program code which, if said assigned storage group construct name is not defined, causes said programmable computer processor to assign said default storage group construct name as the storage group attribute for said logical volume computer readable program code which causes said programmable computer processor to store at a first time said storage class attribute, said data class attribute, said management class attribute, and said storage group attribute, in said library inventory;

computer readable program code which causes said programmable computer processor to retrieve at a second time said storage class attribute, said data class attribute, said management class attribute, and said storage group attribute, from said library inventory; and computer readable program code which causes said programmable computer processor to select management actions for said logical volume based upon said retrieved storage attributes.

* * * * *